United States Patent [19]
Newell et al.

[11] Patent Number: 4,723,268
[45] Date of Patent: Feb. 2, 1988

[54] DUAL MODE PHONE LINE INTERFACE

[75] Inventors: Darryl C. Newell, Baca Raton, Fla.; Karl F. Schroeder, Gaithersburg; Bruce J. Wilkie, Ijamsville, both of Md.

[73] Assignee: International Business Machines Corporation, Armonk, N.Y.

[21] Appl. No.: 910,117

[22] Filed: Sep. 22, 1986

[51] Int. Cl.⁴ .......................................... H04M 11/00
[52] U.S. Cl. ........................................ 379/98; 379/93
[58] Field of Search ............... 379/92, 93, 94, 97, 379/98, 107, 442, 443; 375/5

[56] References Cited

U.S. PATENT DOCUMENTS

| | | |
|---|---|---|
| 3,069,501 | 12/1962 | Gilman et al. |
| 3,517,137 | 6/1970 | Ribner |
| 4,137,556 | 1/1979 | Sessa |
| 4,289,930 | 9/1981 | Connolly et al. |
| 4,306,116 | 12/1981 | McClure et al. |
| 4,313,176 | 1/1982 | Cecil |
| 4,378,470 | 3/1983 | Murto et al. |
| 4,418,416 | 11/1983 | Lese et al. |
| 4,524,244 | 6/1985 | Faggin et al. ............ 379/93 |
| 4,640,989 | 2/1987 | Riner et al. ............. 379/94 |
| 4,685,123 | 8/1987 | Hsia et al. .............. 379/93 |

FOREIGN PATENT DOCUMENTS 2099260 12/1982 United Kingdom .

OTHER PUBLICATIONS

Cermetek Microelectronics, "CH1810 Direct Connect Protective Hybrid (DCPH) Telephone Line Interface", Data Sheet: Integrated Modem Components, Doc. #23, ©1981, printed 4/84.

American Telephone & Telegraph Company, "Data Set 202E Series", Bell System Data Communications Technical Reference, Mar. 1968.

J. Besseyre, et al., "Trunk Circuit for Voice and Data Exchange," IBM Technical Disclosure Bulletin, vol. 9, No. 10, Mar. 1967, p. 1438.

Primary Examiner—Keith E. George
Attorney, Agent, or Firm—John E. Hoel

[57] ABSTRACT

The invention includes a first switch and a second switch serially connected between a telephone network line and a local telephone line which can be selectively connected to alternately either an auto answer modem or a human answer telephone set. A control register is associated with the local telephone line, having data contents representing whether the local telephone line is connected to the auto answer modem or alternately to the human answer telephone set. A billing delay element has an output connected to a control input of the first switch, for delaying the closure of the first switch for a predetermined interval after an answer tone is received over the telephone network line when the control register, which is connected to the control input of the first switch, indicates that the auto answer modem is connected to the local telephone line. A tone overload detector has an input connected to the local telephone line and an output connected to the control input of the first switch, for interrupting the connection between the local telephone line and the telephone network line if tones generated on the local telephone line have a voltage greater than a predetermined amplitude when the control register, indicates that the auto answer modem is connected to the local telephone line. The control register controls the closure of the first switch when the contents of the register indicate that the local telephone line is connected to the human answer telephone set. In this manner, either the auto answer data operations or alternately the human voice signals can be selectively transmitted.

1 Claim, 1 Drawing Figure

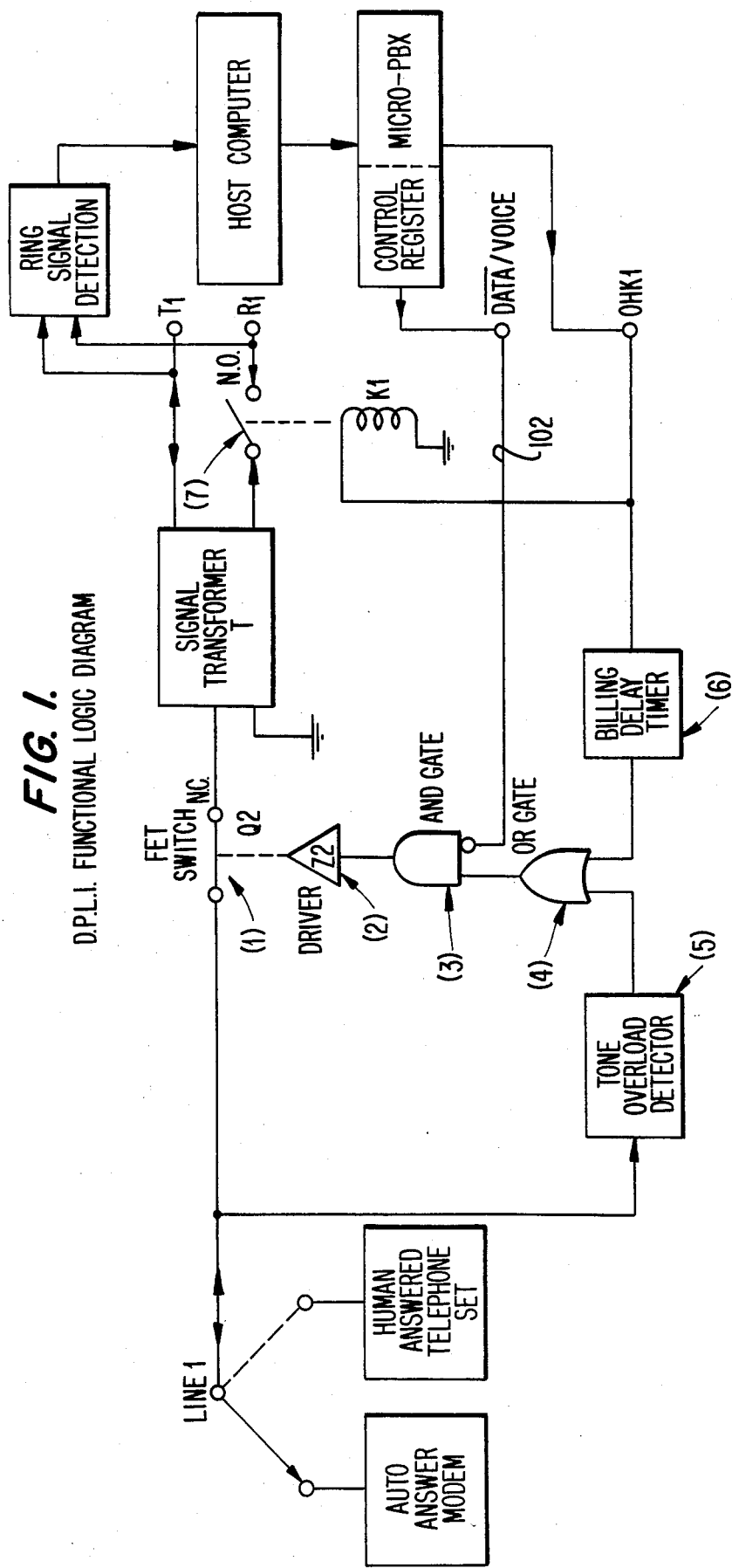

DUAL MODE PHONE LINE INTERFACE

BACKGROUND OF THE INVENTION

1. Technical Field

The invention disclosed herein broadly relates to telephone communications and more particularly relates to telephone interconnection circuits.

2. Background Art

In conventional telephone network operations, the billing process does not start until the called phone goes off hook. When a human answers the called phone, his response is slow enough so as to enable the billing process to be completed before the human begins speaking his answer on the phone. However, in the data/auto answer mode for modems, the answer tone generated by the answering modem is too fast to allow the billing process of the telphone company to be completed. Therefore, in order to allow the billing process to be completed, the FCC has required in its Part 68 Convention, a 2.7 second delay before an auto answer modem can provide an answer tone in responding to a call.

This creates a problem for a human answering a telephone which is to be in alternately a voice or a data mode, since the human must wait 2.7 seconds before he is able to hear or transmit voice signals.

In the prior art, no provision was provided for selectively providing the billing delay for auto answer or alternately no billing delay for human voice answering.

Still another provision of the FCC Part 68 is a tone overload detector which must be associated with auto answering modems. The tone overload detector will interrupt the connection between the modem and the telephone network line if answer tones have a voltage greater than a predetermined amplitude. However, if a human answers the telephone, his voice frequency is within the range of the tones to which the tone overload detector is sensitive. Therefore, it is conceivable that the human voice could trip the tone overload detector, thereby interrupting the connection with the telephone network. Therefore it is also desirable to provide a means for selectively disabling the tone overload detector when a human will be answering the telephone.

OBJECTS OF THE INVENTION

It is therefore an object of the invention to provide a phone line interface which selectively enables a voice mode or alternately a data mode, in an improved manner.

SUMMARY OF THE INVENTION

These and other objects, features and advantages of the invention are accomplished by the dual mode phone line interface invention disclosed herein. The invention includes a first switch and a second switch serially connected between a telephone network line and a local telephone line which can be selectively connected to alternately either an auto answer modem or a human answer telephone set. A control register is associated with the local telephone line, having data contents representing whether the local telephone line is connected to the auto answer modem or alternately to the human answer telephone set. A billing delay element has an output connected to a control input of the first switch, for delaying the closure of the first switch for a predetermined interval after a ringing signal is received over the telephone network line when the control register, which is connected to the control input of the first switch, indicates that the auto answer modem is connected to the local telephone line. A tone overload detector has an input connected to the local telephone line and an output connected to the control input of the first switch, for interrupting the connection between the local telephone line and the telephone network line if tones generated on the local telephone line have a voltage greater than a predetermined amplitude when the control register, which has an output connected to the control input of the first switch, indicates that the auto answer modem is connected to the local telephone line. The control register controls the closure of the first switch when the contents of the register indicate that the local telephone line is connected to the human answer telephone set. In this manner, either the auto answer data operations or alternately the human voice signals can be selectively transmitted.

BRIEF DESCRIPTION OF THE DRAWINGS

The foregoing and other advantages of the invention will be more fully understood with reference to the description of the best mode and the drawing wherein:

FIG. 1 is a schematic diagram of the dual mode phone line interface invention.

DESCRIPTION OF THE BEST MODE FOR CARRYING OUT THE INVENTION

The dual mode phone line interface (DPLI) is shown in FIG. 1, for selectively interfacing between a network telephone line and either an auto answer modem or alternately a human answered telephone set.

In the application of the dual mode phone line interface, the host hardware can be a micro-PBX system such as is disclosed in the copending U.S. patent application Ser. No. 910,055, filed Sept. 22, 1986 by D. C. Newell, et al. entitled "Dual Plane Cross Point Switch Architecture for a Micro-PBX," assigned to IBM Corporation the disclosure of which is incorporated herein by reference. The PLI 100 shown in FIG. 2 of the referenced, copending D. C. Newell, et al. patent application is the DPLI disclosed herein. The micro-PBX will include a control register containing information as to whether the principal operation is to be in the auto answer data mode or alternately in the human answered telephone handset mode. The control register will contain a binary bit which will indicate the alternate data or voice modes of operation.

Referring to FIG. 1, line 1 is one of the interfaces between a telephone hybrid and the DPLI. Terminals R1 and T1 are the interface between the DPLI and the external telephone network. Signal transformer T provides correct impedance matching between the (600 ohm) balanced external network (T1-R1 terminals) and the single-ended internal network (line 1 terminal) while furnishing the degree of isolation required by FCC Part 68 regulations. If the assumption that K1 contact 7 and FET switch 1 are closed, bidirectional voice-band and data signal flow can exit between line 1 and R1-T1 terminals.

When used in the voice mode, the following sequence of events occurs: Assume that the contact controlled by K1 is already in the closed (conducting) position by a signal on terminal OHK1. The data/voice control input 102 from the address decoder in the micro-PBX shown in FIG. 2 of the referenced, copending patent application by D. C. Newell, et al., is driven to a logical "1" (+5 V or "high") which is applied to one input of an AND gate 3. Because a logical "0" (0 V or "low") is needed to enable the gate 3, the signal from the remaining input is inhibited. As a result of this inhibiting action the FET switch remains in the (normally) conducting state and two way voice or data signals can be passed through the device.

When used in the data mode, the following sequence of events occurs: Assume that the contact controlled by K1 is already in the closed position by a signal on terminal OHKI. The data/voice control input is driven to a logical "0" which enables one input of the AND gate 3. Because the tone overload detection circuitry is connected to line 1, it constantly monitors the signals (from either or both directions simultaneously) appearing during a data transmission. If the level of these signals exceeds a pre-defined threshold, (−9 dBm at T1–R1 terminals) this circuit will generate a logic level ("1" in the figure shown) which is applied to the OR gate 4. This signal propagates through the (already enabled) AND gate 3 and on to the FET switch driver 2. The driver 2 in turn causes the FET switch 1 to become nonconducting, thus breaking the transmission path between line 1 and the T1–R1 terminals. This action is required by FCC Part 68 to protect the Public Switched Network from undesired overloads.

The billing delay sequence is initiated by detection of a ring signal by the DPLI which is passed on to the applications software in the host Personal Computer for the micro-PBX described in the referenced, copending patent application by D. C. Newell, et al. The host Personal Computer and the method for interfacing it with the micro-PBX is described in the copending U.S. patent application by D. J. Bradley, et al., Ser. No. 770,541, filed Aug. 29, 1985, entitled "System Shared Interrupt Handlers in a Linked-List Data Structure," assigned to IBM Corporation and incorporated herein by reference. In turn, the applications code activates the OHK1 terminal by bringing it low to a logical "0. "This action activates the K1 contact 7 completing the transmission path from the Public Switched Network to one side of transformer T. While this is occurring, the billing delay timer has generated a signal which is passed through the OR gate 4 to the remaining input of the AND gate 3 and on to the FET switch driver 2. Thus the FET switch 2 is nonconducting for a predetermined amount of time preventing any signal appearing at the line 1 terminal from reaching the transformer and R1-T1 terminals. Upon time-out, the FET switch becomes conducting again and the signal (usually a modem "answer tone") is routed to the Public Switched Network. In this fashion the DPLI meets another requirement imposed by FCC Part 68 which states that no signal shall appear on the line for a period of 2.5 seconds after pickup (or "off-levels") to permit local operating companies to perform their billing identification sequence.

In this manner, the dual mode phone line interface can selectively permit conventional auto answer data operations to take place with the tone overload detector and the billing delay circuitry being effective, or it will alternately allow conventional human voice signals to be transmitted with no intervention by the tone overload detector or the billing delay circuitry.

What is claimed is:

1. A dual mode phone line interface, comprising:

a first switch and a second switch serially connected between a telephone network line and a local telephone line which can be selectively connected to alternately either an auto answer modem or a human answer telephone set;

said second switch having a control input coupled to ring detection means, said second switch becoming conductive in response to the detection of a ring signal;

a select input associated with said local telephone line, having data representing whether said local telephone line is connected to said auto answer modem or alternately to said human answer telephone set;

a billing delay means having an output connected to a control input of said first switch, for delaying the conduction of said first switch for a predetermined interval after a ring signal is received over said telephone network line when said select input, which is connected to said control input of said first switch, indicates that said auto answer modem is connected to said local telephone line;

a tone overload detector means having an input connected to said local telephone line and having an output connected to a control input of said first switch, for interrupting the connection between the local telephone line and said telephone network line if tones generated on said local telephone line have a voltage greater than a predetermined amplitude when said select input indicates that said auto answer modem is connected to said local telephone line;

said select input controlling the conduction of said first switch when the data thereon indicates that said local telephone line is connected to said human answer telephone set;

whereby either data signals to or from said auto answer modem or alternately human voice signals can be selectively communicated.

* * * * *